United States Patent
Liu et al.

(10) Patent No.: US 6,751,694 B2
(45) Date of Patent: Jun. 15, 2004

(54) SILICON DISK DRIVE WITH FEW SLOTS FOR PLURAL DISKS

(75) Inventors: Wen-Tsung Liu, Hsin Tien (TW); Chia-Li Chen, Hsin Tien (TW); Mi-Chang Chen, Hsin Tien (TW)

(73) Assignee: Carry Computer Eng. Co., Ltd., Taipei (TW)

( * ) Notice: Subject to any disclaimer, the term of this patent is extended or adjusted under 35 U.S.C. 154(b) by 469 days.

(21) Appl. No.: 09/940,897

(22) Filed: Aug. 29, 2001

(65) Prior Publication Data

US 2003/0046469 A1 Mar. 6, 2003

(51) Int. Cl.⁷ .................................................. H05K 7/10
(52) U.S. Cl. ........................................ 710/301; 439/638
(58) Field of Search ................... 710/301, 36; 361/737; 439/76.1, 904, 906, 945, 638

(56) References Cited

U.S. PATENT DOCUMENTS

| | | | |
|---|---|---|---|
| 6,199,122 B1 * | 3/2001 | Kobayashi | 710/36 |
| 6,386,920 B1 * | 5/2002 | Sun | 439/630 |
| 6,402,558 B1 * | 6/2002 | Hung-Ju et al. | 439/638 |
| 6,524,137 B1 * | 2/2003 | Liu et al. | 439/638 |
| 6,612,492 B1 * | 9/2003 | Yen | 235/451 |

* cited by examiner

Primary Examiner—Khanh Dang
(74) Attorney, Agent, or Firm—Bacon & Thomas, PLLC

(57) ABSTRACT

A silicon disk drive with few slots for plural disks capable of being built in or externally connected with a main frame of a computer or any digital product, it satisfies the requirements of consumers of various groups of people by the function of reading and writing silicon disks (portable memory cards). The silicon disk drive provides a slot to suit insertion of SM, MM, MS and SD cards, and provides another slot to suit insertion of Type I, Type II or Type I CF card, or Type II or Type III PCMCIA card, in this way, data in the files of any of the above silicon disks can be read and written. And it can be assisted with provision of the design of the IDE/ATAPE, USB or 1934 delivery unit, in order that the silicon disk drive having a single slot or two slots not only for reading and writing on and for insertion of the now available silicon disks, but also for solving the long pending problems of confusing, misleading and being subjected to damage of the conventional techniques with more than three slots.

6 Claims, 4 Drawing Sheets

SILICON DISK DRIVE WITH FEW SLOTS FOR PLURAL DISKS

BACKGROUND OF THE INVENTION

1. Field of the Invention

The present invention is related to a silicon disk drive with few slots for plural disks capable of being built-in or externally connected with a main frame system of a computer or any of other digital products, and especially to a silicon disk drive with few slots for plural disks having a single slot or two slots with the function of reading and writing silicon disks (portable memory cards) of various specifications to satisfy the requirements of consumers of various groups of people, and to solve the long pending problems of confusing, misleading and being subjected to damage of conventional techniques having silicon disk drives designed to have more than three slots.

2. Description of the Prior Art

A silicon disk drive is a device able to read and write silicon disks (also called as portable memory cards); the silicon disks are light, thin and small, they have the superior features of having high storage capacity, vibration durability as well as repeated memory function, and can be widely used in the field of information appliances (IA) and multiple portable digital products. For example, popular products in the markets such as personal digital assistants (PDA), digital cameras (DSC), MP3 players etc. nearly all use silicon disks as storage media.

In view that IA is a new field of products, the products in the field are novel and include multiple kinds, standards of silicon disks become the criteria which make struggles for development as well as competitions among international big manufacturers in the markets. There is no uniform standard or specification presently in the art of silicon disks in the whole world. Products that are mutually related not only are multifactorial, but also have their respective predominance in the markets, but they are just lack of uniform standards and specifications for silicon disks. This renders various portable digital products and computer systems and peripheral equipments of computers unable to achieve effective availability, and also makes inconvenience of use of consumers. The followings are the available silicon disks in the markets presently:

1) PCMCIA Cards (PCMCIA ATA Flash Cards)

The specifications of PCMCIA cards are established by the Personal Computer Memory Cards International Association (PCMCIA), this specifications of standards include: length 85.6 mm, width 54 mm, while about thickness, they are divided into three kinds: those for Type I (3.3 mm), Type II (5 mm) and Type III (10.5 mm); and are applied to notebook PCs'.

2) CF Cards (Compact Flash Cards)

The specifications of CF cards are of those memory cards which are light, thin and small, this specifications of standards include: length 43 mm, width 36 mm, while about thickness, they are divided into two kinds: those for Type I (3.3 mm) and Type II (5 mm); they are characterized by small volume, light weight, good data preservation ability, high reliability and electricity saving; thereby are quite often used on consumable electronics, and mostly are applied to the peripheral equipments of IAs' such as personal digital assistants (PDA), digital cameras (DSC), MP3 players etc.

3) SM Cards (Smart Media Cards)

Thickness in the specifications of the SM cards is only 0.76 mm. Manufacturers make such cards by direct specific packaging and sealing flash memories in cards; the electric interfaces of the cards are same as those of the flash memories of the manufacturers. The cards are applied mainly on digital cameras (DSC), MP3 players etc.

4) MM Cards (Multimedia Cards)

The specifications of MMC cards are of those silicon disks with the smallest sizes in the markets presently. Thickness of such a card is only 1.4 mm. They use series interfaces, and are applied mainly to digital cameras (DSC), MP3 players, mobile phones etc.

5) MS Cards (Memory Stick Cards)

The specifications of MS cards are about the size of an Arrow brand chewing gum. They use series interfaces. The patent right of the silicon disks belongs to SONY, and has been authorized to some other manufacturers for use. Presently, products apply the MS cards are all those developed and sold solely by SONY, including digital cameras (DSC), MP3 players, PDA, mobile phones with the functions of walkmans and networking, and PCs' etc.

6) SD Cards (Secure Digital Cards)

Thickness in the specifications of the SD cards is only 2.1 mm, the rest of their apparent sizes are same as those of the MM cards. They use series interfaces too, and are applied mainly to MP3 players, digital cameras (DSC), PDA etc.

By the fact that specifications of the silicon disks are diversified, manufacturers develop silicon disk drives for supporting various silicon disks in view of the fast rising tendency of information appliances (IA) and non-uniform specifications of silicon disks to satisfy the requirements in the markets. However, silicon disks have a plurality of standards, manufacturers of silicon disks can only add number of slots on a silicon disk drive to support silicon disks of various specifications; there have been, for example, three-slot silicon disk drives (for supporting three silicon disk specifications), four-slot silicon disk drives (for supporting four silicon disk specifications) etc.

The measures and construction for conventional multiple-slot silicon disk drives can solve part of the trouble of non-uniform specifications of silicon disks, they bring more problems and inconvenience for users though, such as:

1) Unduly added slots make confusion in use—for example, four-slot silicon disk drives used can support silicon disks of four specifications of SM, MM, MS and SD cards. However, such silicon disk drives will have only on the screen thereof: multiple marks of F slot/G slot/H slot/I slot etc. rather than SMC slot/MMC slot/MSC slot/SDC slot, a user thereby is unable to distinguish which mark represents which of the memory cards has been inserted in. This is subjected to making confusion in use.

2) Unduly added slots make inconvenience in use—similar to the above example, if a silicon disk drive is designed to support the IDE/ATAPI system interfaces, when it is connected to the system interfaces: a four-slot silicon disk drive can only get two slots to function at the same time, (in mutual supporting with the IDE/ATAPI at the end of the mainframe, each connecting line can at most be provided for processing two set of different signals). The rest two slots are thereby provided for nothing, they are inactive when a user wants to read/write in a third memory card, and even the system will be down.

3) Other problems include: unduly added slots make wrong insertion by the user into incorrect slots to damage silicon disks or the slots, this can result the large defects of increasing cost of production, overly large volume and inferior built-in supporting functions etc. resided in all the conventional silicon disk drives with more than three slots.

SUMMARY OF THE INVENTION

In view of the defects resided in the conventional techniques, the inventor of the present invention studied and developed the present invention against the problem of non-uniform specifications of silicon disks, and finally gets a silicon disk drive with few slots for plural disks to solve the long pending problems.

Particularly, the silicon disk drive with few slots for plural disks of the present invention provides a slot to suit insertion of those SM, MM, MS and SD cards, and provides another slot to suit insertion of Type I, Type II or Type I CF card, Type II or Type III PCMCIA card, in this way, data in the files of any of the above silicon disks can be read and written, they can be assisted with provision of the design of the IDE/ATAPE, USB or 1934 delivery unit, in order that the abovementioned silicon disk drive having a single slot or two slots can be read and written and used for insertion of all the presently available memory cards.

The primary object of the present invention is to provide the design of a silicon disk drive with a single slot or two slots to support at the same time silicon disks of various specifications, in order that the diversified silicon disks can be communicated without hindering with various portable products, PCs' and peripheral equipments of a computer in a simpler and more convenient mode. Thereby, a user can get excellent convenience of use, and the confusion resided in the conventional techniques can be gotten rid of.

The secondary object of the present invention is to provide a neat and simplified design for a silicon disk drive assisted with provision of the design of the IDE/ATAPE, USB or 1934 delivery unit, in order that the silicon disk drive can be easily built-in or connected externally to a mainframe system of a computer of any of various specifications and its related peripheral equipments to satisfy the requirements of consumers of various groups of people. In this way, the silicon disks of various specifications can be coordinated, so that a silicon disk drive can be more coincident with the market system.

Additionally, by lacking standardization of specifications of silicon disks in the past, systematic manufacturers hesitate in whether a silicon disk drive can be built-in the system, this indirectly makes disorder of the silicon disks competitive in the markets, and such situation makes loss of rights and interests of consumers. The problem can be solved by using the silicon disk drive with few slots for plural disks of the present invention which renders the unsolvable problem of non-uniform specifications of silicon disks and the problem of whether a silicon disk drive can be built-in the system to be overcome through the present invention. This is large good news for systematic manufacturers and consumers.

The present invention will be apparent in its contents of technique and characteristics after reading the detailed description of the preferred embodiment thereof in reference to the accompanying drawings.

DETAILED DESCRIPTION OF THE PREFERRED EMBODIMENT

Figure 1:
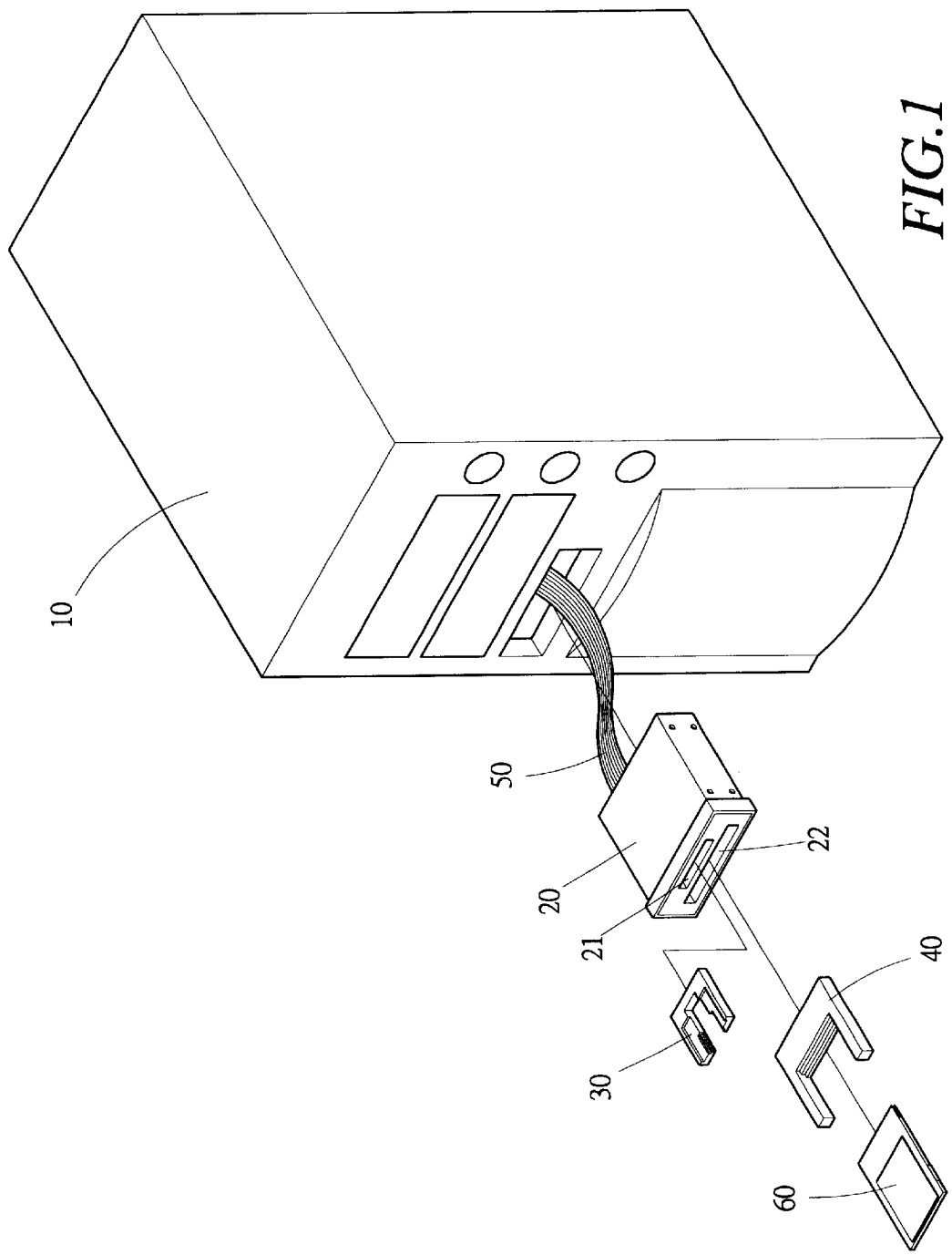
FIG. 1 is an analytical perspective view of a first embodiment of the present invention built-in a mainframe system of a computer.

Referring firstly to FIG. 1, the silicon disk drive with few slots for plural disks of the present invention can be built-in a mainframe system 10 of a computer or some other digital product. The drive comprises: a main body 20, a first insertion cassette 30, a second insertion cassette 40 and a delivery unit 50, wherein:

The main body 20 is apparently designed to be rectangular suitable to insert into the mainframe system 10 of the computer or some other digital product; and has therein a receiving space to receive an electric circuit board and other electronic elements. The front end thereof is provided with a first slot 21 and a second slot 22. The first slot 21 and the second slot 22 are located on the external surface of the mainframe 10 of the computer, so that memory cards 60 can be inserted into the main body 20 through the first slot 21 and the second slot 22. The first insertion cassette 30 is provided in the main body 20 in correspondence with the position of the first slot 21, and the second insertion cassette 40 is provided in the main body 20 in correspondence with the position of the second slot 22; thereby, a memory card 60 can be inserted into the main body 20 through the first slot 21 or the second slot 22 to connect with the first insertion cassette 30 or the second insertion cassette 40.

Figure 2:
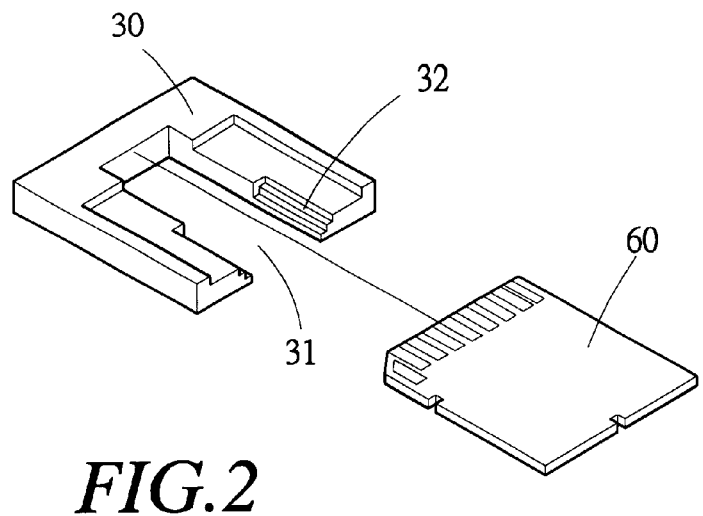
FIG. 2 is a perspective view of a first insertion cassette of the present invention.

As shown in FIG. 2, the first insertion cassette 30 is in the shape of "U", the middle area thereof is an engaging area 31 provided at least with four guide grooves 32 of different lengths and widths to respectively guide four kinds of memory cards 60 (SM, MM, MS and SD cards), any of the four kinds of memory cards 60 (only one kind is shown in the drawing) can be engaged in the engaging area 31 by guiding of one of the four guide grooves 32 and fixed in the first insertion cassette 30. When a memory card 60 is fixed in the first insertion cassette 30, signals can be started to transmit to the abovementioned electric circuit board in the main body.

Figure 3:
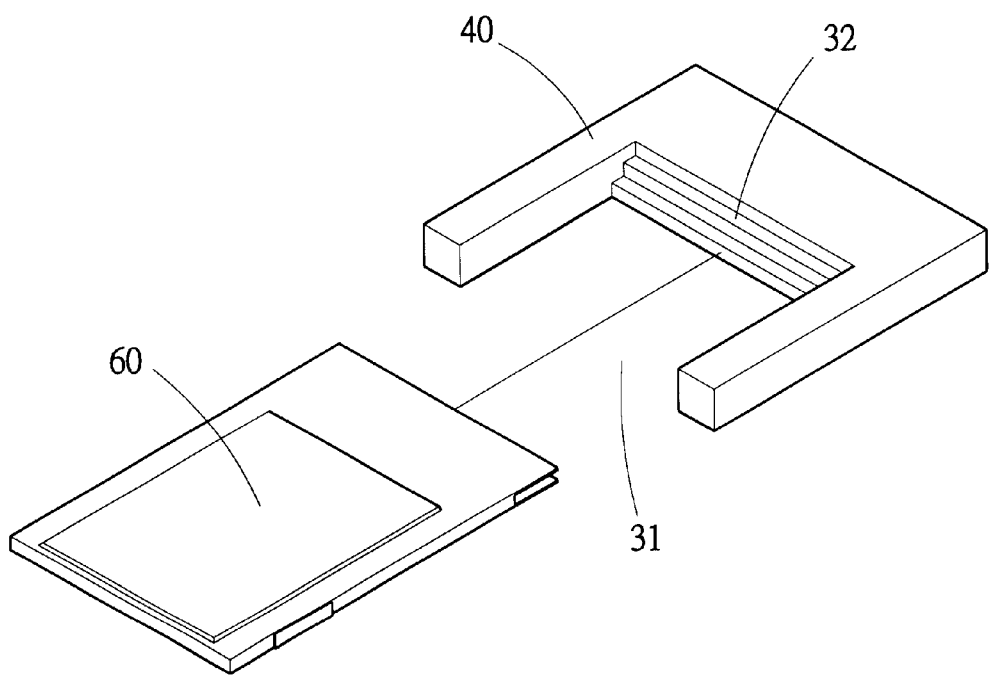
FIG. 3 is a perspective view of a second insertion cassette of the present invention.

As shown in FIG. 3, the second insertion cassette 40 is in the shape similar to that of the first insertion cassette 30; and also is provided with an engaging area 31 and a plurality of guide grooves 32 of different lengths and widths, only that the guide grooves 32 in the second insertion cassette 40 are used to guide memory cards 60 of Type I, Type II and Type III PCMCIA cards (only one kind is shown in the drawing), and one of the memory cards 60 of any thickness can be fixed in the second insertion cassette 40, after that, signals can be started to transmit to the abovementioned electric circuit board in the main body.

Referring again to FIG. 1, the abovementioned delivery unit 50 is connected between the mainframe system 10 of the computer and the main body 20, and is used mainly for transmitting signals. When a memory card 60 is engaged in the main body 20 by inserting into the first slot 21 or the second slot 22, the electric circuit board provided in the main body 20 can read the files stored in the memory card 60 to transmit to the mainframe system 10 of the computer by the delivery unit 50; and the data transmitted back from the mainframe system 10 can be transmitted by the delivery unit 50 to the memory card 60 for saving, so that the memory card 60 can have the functions of reading and writing.

One thing worth mentioning, the main body 20 of the silicon disk drive in FIG. 1 is built in the mainframe system 10 of a computer or another digital product, thereby the delivery unit 50 is preferably of the specification of the interface of the IDE/ATAPE system (this is a known technique); the delivery unit 50 of the specification of the interface of the IDE/ATAPE system is designed in principle as a built-in mode. In mutual supporting with the IDE/ATAPE system on the mainframe system 10 of the computer, each connecting line at most can be provided for processing two set of different signals (the Master and Slave structures by definition), i.e., even conventional three-slot and four-slot silicon disk drives can also be designed for supporting the IDE/ATAPE system. However in practical using, such a silicon disk drive can only support the first and the second ones of the cards of different specifications according to the sequence of inserting of them, and is unable to deal with signals of the third and other subsequent memory cards. Under a bad situation, the computer will be down.

Nevertheless, with the design of the first and the second insertion cassettes 30, 40, a silicon disk drive can meet the definition of such requirement. Although the first and the second insertion cassettes 30, 40 can allow engagement of the memory cards 60 of different specifications therein, they can only allow engagement of one kind of the memory cards 60 therein respectively each time, and can only at most allow engagement of two kinds of the memory cards 60 therein at the same time when in use. Thereby, the down situation stated above of inserting the third card and other subsequent memory cards in a conventional three-slot or four-slot silicon disk drive can be avoided.

In other words, the present invention has larger using space than the three-slot or four-slot silicon disk drives (the present invention can allow insertion of memory cards of seven specifications therein, including SM, MM, MS and SD cards and Type I, Type II and Type III PCMCIA cards therein, while a conventional three-slot or four-slot silicon disk drive can only allow insertion of three or four cards); and they will not make confusion of the consumers or result down situation occurred when more than three memory cards are inserted in a three-slot or four-slot silicon disk drive, this is the largest advantage of the present invention.

Figure 4:
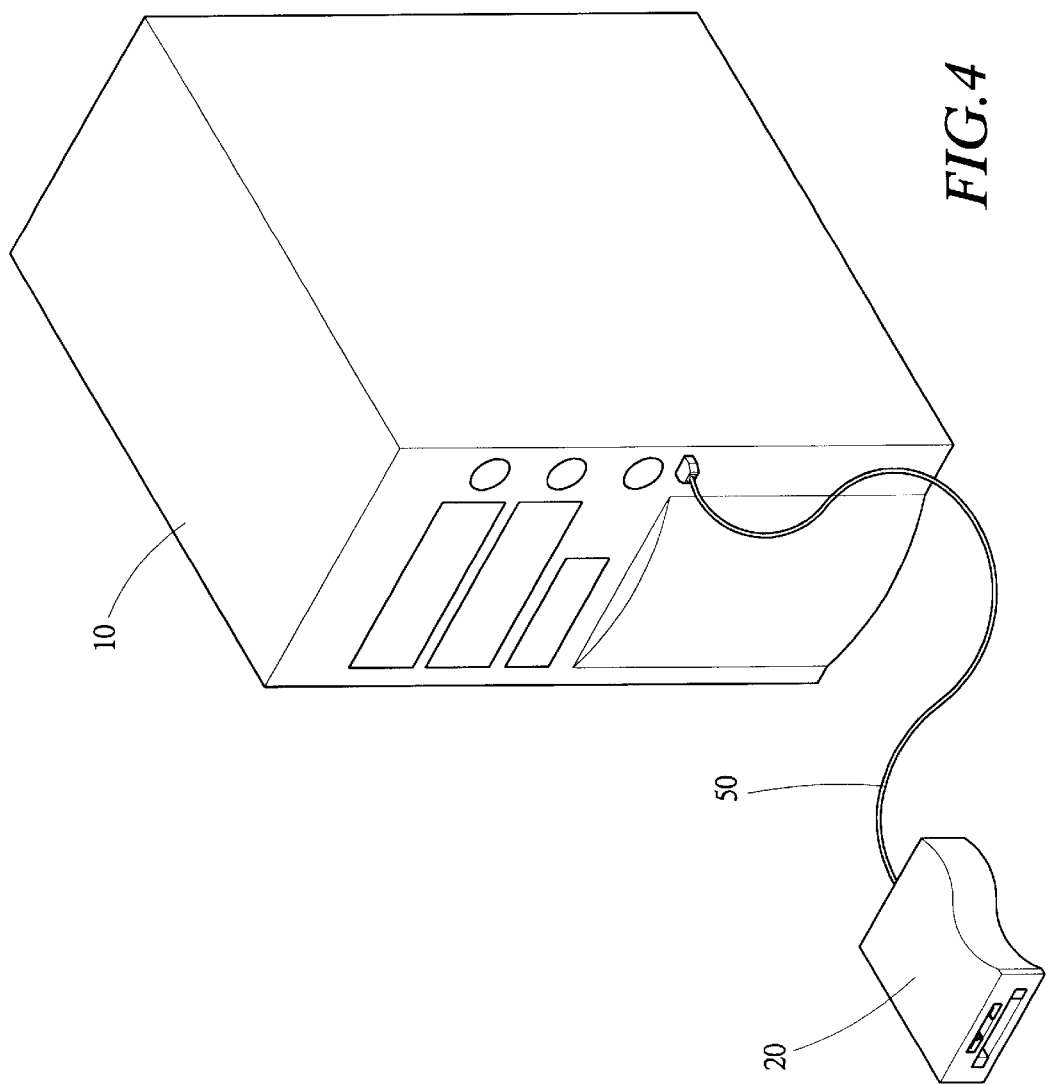
FIG. 4 is a perspective view of a second embodiment of the present invention externally connected to the mainframe system of the computer.

In the embodiment of the present invention as shown in FIGS. 1 to 3, the main body 20 is built in the mainframe system 10 of the computer or another digital product; in practice of the present invention, in order to coordinate with the situation that the mainframe system 10 of the computer or the digital product now available is unable to provide a building-in environment, the delivery unit 50 can be designed to be of the specification of the system interface of USB or 1394 (as shown in FIG. 4) for connecting the main body 20 externally to the mainframe system 10 of the computer for reading from and writing in the memory cards.

Figure 5:
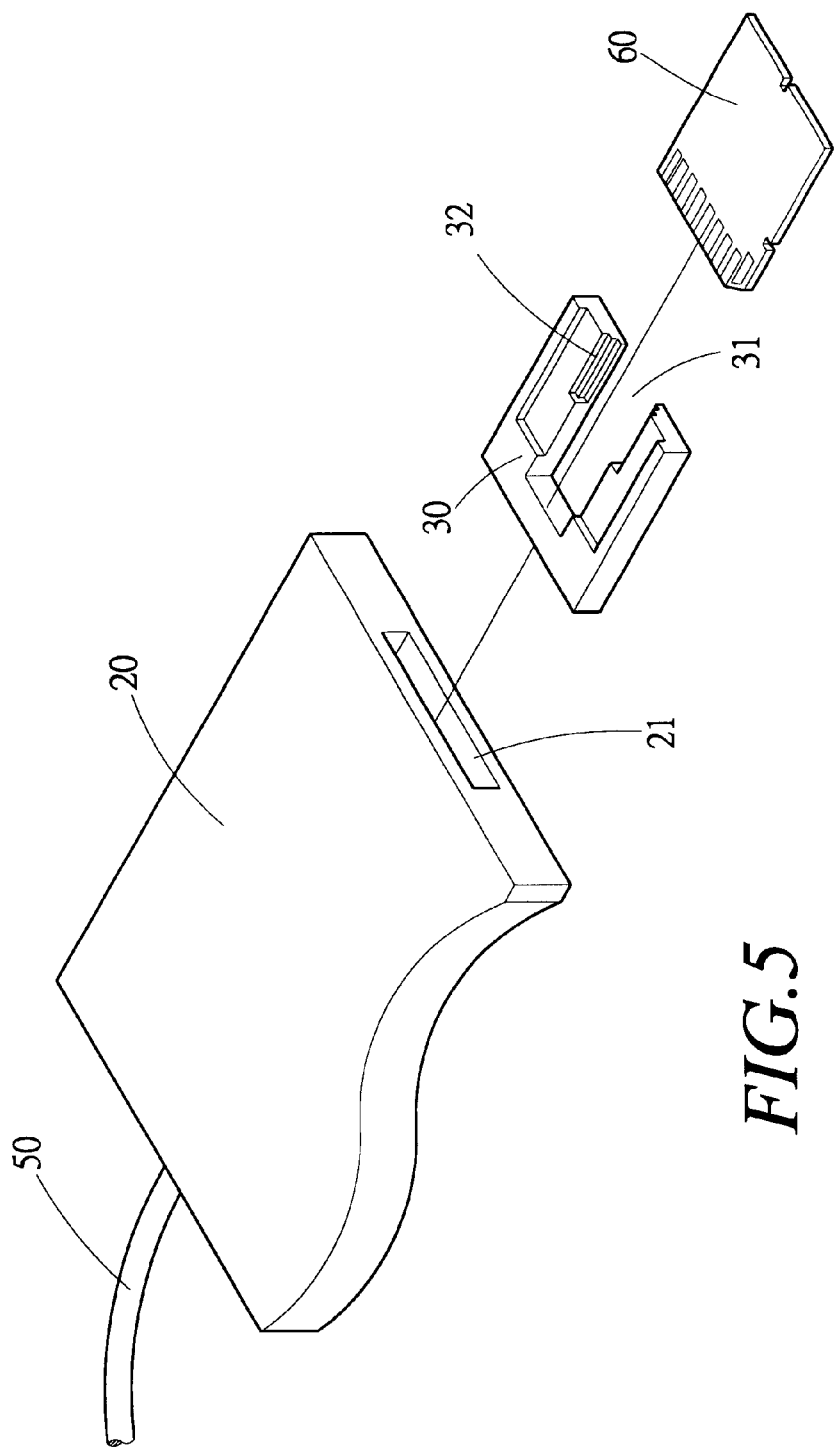
FIG. 5 is an analytical perspective view of a third embodiment of the present invention provided with the first insertion cassette.

As shown in FIG. 5, the present invention is not limited to two slots in practice, however, it basically can be provided with the first slot 21, the first insertion cassette 30 and the delivery unit 50 at least for reading and writing four kind of memory cards 60, i.e., SM, MM, MS and SD cards.

Besides, the abovementioned second insertion cassette 40 used with three specifications of the Type I, Type II and Type III PCMCIA cards can also be used with two specifications of the Type I and Type II CF cards under the same structural principle, and no further description of them is required.

The above stated structure of components and their titles are only for illustrating the technical content of a preferred embodiment of the present invention, and not for giving any limitation to the scope of the present invention. It will be apparent to those skilled in this art that various modifications or changes can be made to the elements of the present invention, and shall fall within the scope of the appended claims.

What is claimed is:

1. A silicon disk drive with few slots for plural disks comprising:

a main body built in or externally connected to the mainframe system of a computer or a digital product and having therein a receiving space to receive an electric circuit board and other electronic elements, the front end thereof is provided with a first slot for insertion therethrough of memory cards into said mainframe system of said computer;

a first insertion cassette provided in said main body in correspondence with the position of said first slot; the middle area of said first insertion cassette is an engaging area provided with a plurality of guide grooves of different lengths and widths to respectively guide a plurality of memory cards which include at least four kinds, any of said four kinds of memory cards is adapted to engaging in said engaging area by guiding of one of said guide grooves and fixed in said first insertion cassette, when a memory card is fixed in said first insertion cassette, signals is transmit to said electric circuit board in said main body; and a delivery unit connected between said mainframe system of said computer and said main body and being of the specification of the interface of an IDE/ATAPE system, said memory card is engaged in said main body by inserting into the first slot, said electric circuit board provided in said main body reads the files stored in said memory card to transmit to said mainframe system of said computer by said delivery unit in a two-way mode.

2. A silicon disk drive with few slots for plural disks as in claim 1, wherein,
said four kinds of memory cards are respectively SM, MM, MS and SD cards.

3. A silicon disk drive with few slots for plural disks as in claim 1, wherein,
said delivery unit is designed to be of the specification of the system interface of USB, said main body is connected externally to a main frame of a computer or any of other digital products.

4. A silicon disk drive with few slots for plural disks as in claim 1, wherein,
said delivery unit is designed to be of the specification of the system interface of 1394, said main body is connected externally to a main frame of a computer or any of other digital products.

5. A silicon disk drive with few slots for plural disks as in claim 1, wherein,
said main body is further provided on the front end thereof with a second slot, a second insertion cassette is provided in said main body in correspondence with the position of said second slot; the middle area of said second insertion cassette is an engaging area provided at least with three guide grooves to respectively guide any of three kinds of Type I, Type II and Type III PCMCIA cards, then signals is transmit to said electric circuit board in said main body.

6. A silicon disk drive with few slots for plural disks as in claim 5, wherein,
said guide grooves of said second insertion cassette are used to guide Type I and Type II CF cards.

* * * * *